Sept. 6, 1955     H. D. BRAILSFORD     2,717,350
GOVERNOR FOR ELECTRICAL MOTORS
Filed Feb. 25, 1953     3 Sheets-Sheet 1
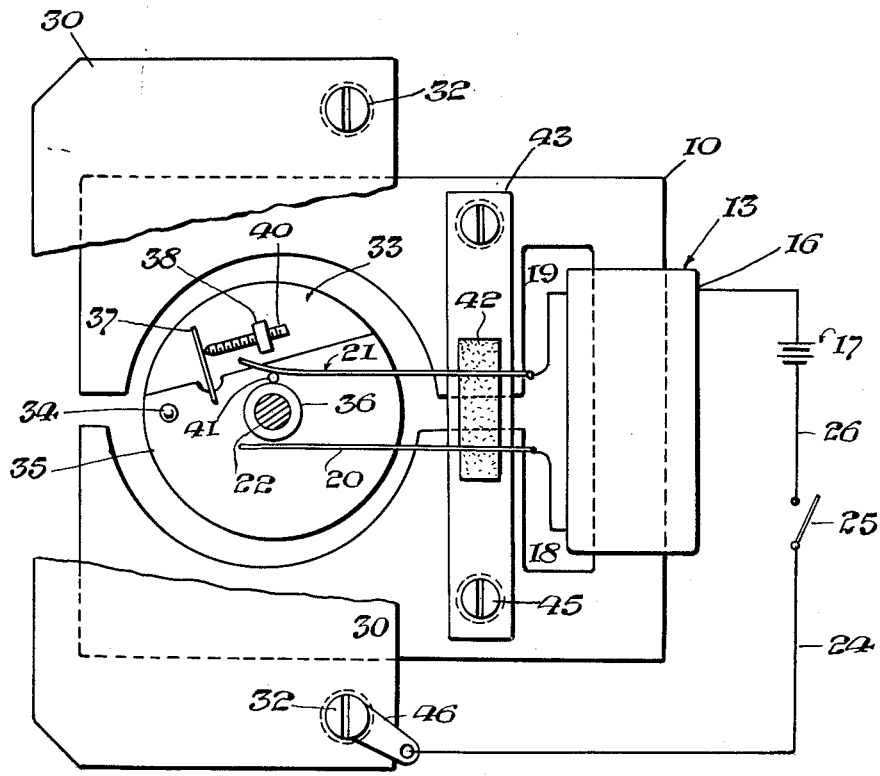
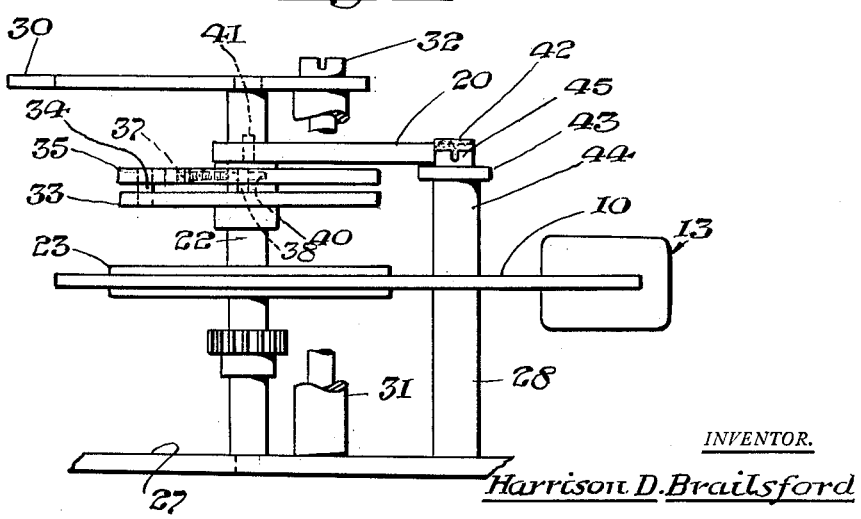
INVENTOR.
Harrison D. Brailsford
BY Darby & Darby
ATTORNEYS Sept. 6, 1955 H. D. BRAILSFORD 2,717,350
GOVERNOR FOR ELECTRICAL MOTORS
Filed Feb. 25, 1953 3 Sheets-Sheet 2

INVENTOR.
Harrison D. Brailsford
BY Darby & Darby
ATTORNEYS.

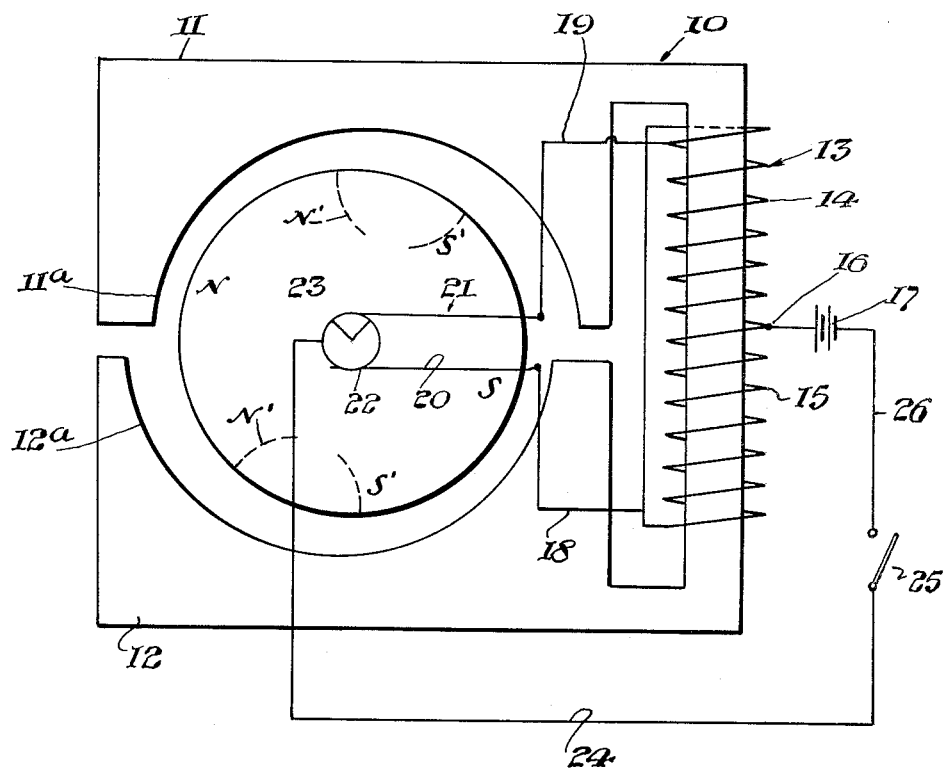

United States Patent Office 2,717,350
Patented Sept. 6, 1955

2,717,350

GOVERNOR FOR ELECTRICAL MOTORS

Harrison D. Brailsford, Rye, N. Y.

Application February 25, 1953, Serial No. 338,829

11 Claims. (Cl. 318—254)

The present invention relates to governors for electrical motors and particularly to governor mechanism for use with a motor of the type disclosed in my Patent No. 2,457,637, issued December 28, 1948. The motor of that invention is a direct current motor which has self-starting characteristics and which is adapted to be operated by current from a low voltage source such, for example, as a battery or dry cells.

The governor of my present invention is adapted to limit the speed of the motor above-mentioned. In one embodiment of my invention the speed limiting is effected by cutting off the current to the motor when the motor speed exceeds a predetermined limit. In another form of my invention the speed limiting is effected by so modifying the phase relationship of the energization of the motor winding with respect to the magnetic effects resulting from permanent magnetization that the motor cannot exceed a predetermined speed.

In both forms of my invention the speed limiting control is brought about by movement of a control member resulting from the centrifugal force exerted by the motor.

It is an object of my invention to provide a governing device effective to limit the speed of an electrical motor of the type shown in my patent above referred to.

It is another object of my invention to provide such a governor which is operated by centrifugal force.

It is another object of my invention to provide a governor of the type described wherein the governing action is effective to de-energize the motor winding.

It is another object of the invention to provide a governor of the type described wherein the governor action is effective to vary the time of closure of contacts supplying the motor winding with respect to the position of the motor rotor.

It is a still further object of the invention to provide a governor which, in addition to limiting the upper speed of the motor, is effective to assure reliable starting of the motor.

Other objects and features of the invention will be apparent when the following description is considered in connection with the annexed drawings, in which, Figure 1 is a top plan view of that embodiment of my invention in which the governing action is effected by cutting off the supply of current to the motor windings. In this figure the upper mounting plate has been broken away in order that the governor structure may be clearly seen;

Figure 2 is a side elevation of the device of Figure 1;

Figure 5 is a top plan view of the field pieces and rotor, together with a diagrammatic circuit of the motor of my patent above referred to.

Figure 3:
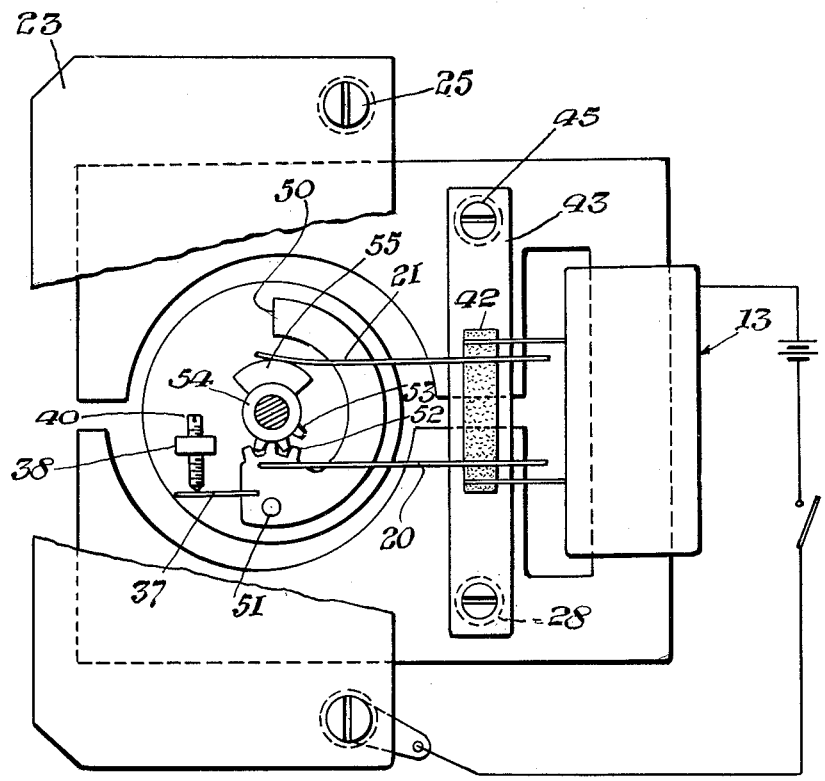
Figure 3 is a top plan view similar to Figure 1 but showing the second embodiment of my invention.

Referring now to the drawings, and particularly to Figure 5 thereof, there are shown therein the essential parts of a motor of the type described in my patent hereinabove mentioned. The structure comprises a laminated field core 10 having two pole pieces 11 and 12 and a winding 13. The winding 13 is center tapped at 16 and comprises in effect two field coils 14 and 15. The center tap 16 is connected to a source of direct current such for example as a battery 17, the other ends of the coils 14 and 15 being connected by conductors 18 and 19 to contact members 20 and 21 respectively. The contact members are alternately contacted by a contact comprising an eccentric portion of the motor shaft 22 so that the field coils 14 and 15 are alternately energized during the rotation of the motor rotor 23. The rotor 23 is fixed to the shaft 22 for rotation between the field poles 11 and 12.

The shaft 22 of the rotor is conductive and is connected by means of a conductor 24 to the switch 25 and thence through conductor 26 to the other terminal of the battery 17.

As will be obvious, when the coil 14 is energized the pole pieces 11 and 12 will have polarities of opposite signs and when the coil 15 is energized the poles will likewise have opposite polarity but the polarities will be reversed with respect to those produced when coil 14 is energized.

Rotor 23 is formed of highly magnetizable material such as "Alnico" and is permanently magnetized in a diametrical band to provide magnetic poles at the armature periphery, the poles being marked N and S in Figure 5 for identification. The magnetic effect of the poles is strongest at the two indicated pole portions, but the magnetism spreads out with decreasing strength from each polar region toward areas indicated generally rather than with precision by the dotted boundary lines N' and S'. Between the indicated boundaries of the N and S poles of the armature are areas that are not permanently magnetized or at least not appreciably so.

As is clearly shown in Figure 5 the field poles 11 and 12 are provided with pole faces 11a and 12a respectively which are eccentric with respect to the axes of rotation of the rotor 23. The pole faces are spaced from the armature periphery distances which increase in a counterclockwise direction as viewed in Figure 5 and the rotor is irreversible and always operates in a counterclockwise direction.

In Figure 5 the magnetic poles of the armature are shown in a position corresponding to the shortest magnetic path between diametrical portions of the pole faces 11a and 12a. The eccentric portion of shaft 22 is in contact with the contact member 21 and upon closing of the field circuit, as for example by means of the switch 26, the coil 14 will be energized. If it be assumed that the flow of current through the coil 14 in the direction indicated will cause the field pole 11 to become a north pole and field pole 12 a south pole then the upper portion of the field pole 11 will repel the north pole of the armature in a counterclockwise direction while the south field pole at its lower portion will repel the south pole of the armature also in a counterclockwise direction. Concurrently with the repelling action of each field pole on the armature poles of like polarity, the upper portion of the south field pole 12 will attract the north pole of the armature while the lower portion of the north field pole 11 will attract the south pole of the armature, these forces acting in a direction to produce counterclockwise rotation of the rotor.

When the eccentric portion of the shaft 22 is moved through an arc of approximately 100° from the position shown in Figure 5, the field circuit is broken and the field poles become non-magnetic. The permanently magnetic poles of the armature, due to the attraction to the faces of the field poles, tend to move progressively in a counterclockwise direction and therefore continue to exert rotative force on the rotor 23. As the rotor advances, the eccentric portion will make contact with the other contact member 20 and thereby effect energization of the field coil 15 which re-energizes the field poles but with polarities reversed from those of the previous energization. Thus the rotor is caused to continue its rotation in the manner described in detail in my patent above referred to and indicated only briefly herein.

By my present invention means are provided which substitute for the eccentric portion of the shaft 22 and which provide means for completing the circuits to the field windings in such a manner as to limit the upper speed of the rotor 23.

Referring now to Figures 1 and 2, there is shown therein a motor such as has been described having a governing means in accordance with one embodiment of my present invention. The motor as shown in these figures comprises the field core 10 which field core is mounted upon a base plate 27 being spaced above that base plate by means of the bushings 28. Shaft 22 is mounted in the base plate 27 at its lower end and in an upper plate 30 at its upper end, the plates 27 and 30 being spaced apart by means of the bushings 31 which extend between the upper plate 30 and the lower plate 27 and are held in position by means of screws 32 extending through the bushings and into tapped holes in the lower plate 27. The rotor 23 is of course fixed to the shaft 22 in a position to cooperate with and lie between the field poles 11 and 12.

Mounted on the shaft 22 in any suitable position, but as shown slightly above the rotor 23, is a disk 33 which is fixed to the shaft 22 for rotation therewith. Pivotally mounted on a pin 34 extending upwardly from the disk 33 is a centrifugal weight 35 which weight is provided with a central aperture 36 considerably larger than the diameter of the shaft 22 so that the shaft acts to limit the movement of the weigth 35 under the urge of centrifugal force.

Fixed in one edge of the sector-shaped weight 35 is a leaf-spring 37 which spring extends outwardly above the disk 33. Extending upwardly from disk 33 is a block 38 which is provided with a threaded bore in which a setscrew 40 is inserted, this screw being provided with a point which bears against the spring 37 and thus acts in a direction opposite to that of the centrifugal force.

Adjacent the edge of the aperture 36 in weight 35 there is provided an upwardly extending pin 41 which pin is adapted to alternately make contact with contact member 20 or 21 as the rotor 23 and disk 33 rotate.

Contact members 20 and 21 are fixed in an insulating block 42 which block forms part of a mounting strip 43, the mounting strip 43 being supported on bushings 44 which are arranged on the field core 10 and constitute in effect extensions of the bushings 28. Screws 45 extend through respective bushings 44 and 28 and into tapped holes in the base plate 27 so that the entire structure is rendered rigid.

The conductor 24, previously referred to, is connected to the upper plate 30 by means of a terminal 46 and thus the circuit is completed from the battery 17 to the motor shaft 22 and through that shaft and the disk 33, pin 34, and weight 35 to the contact pin 41.

Spring 37 is so located in the weight 35 that it moves the pivoted segmental weight in a counterclockwise direction about the pivot 34, thus increasing the radial distance of the contact pin 41 from the center of shaft 22. When the rotor is at rest the orbital path of the contact post 41 is therefore at its maximum diameter and the duration of the period during which the post is in contact with the contact 20 or 21, as the case may be, is at a maximum.

When the motor starts, centrifugal force causes the weight or segment 35 to move in a clockwise direction about the pivot 34 against the tension of the spring 37. This clockwise motion of the weight 35 causes the post 41 to move closer to the shaft center and consequently reduces the duration of contact of the post with the contacts 20 and 21. Since the aperture 36 in the weight 35 is sufficiently large to permit the weight to move to a position in which the contact post 41 fails to contact with the contacts 20 and 21, there is a point at which the motor field windings are no longer energized and thus the upper speed of the motor is limited. The speed attainable is a function of the unbalanced mass of the weight 35 and the degree of tension of the spring 37.

With the arrangement just described it is possible to produce a motor in accordance with the patent abovementioned which will operate at a predetermined constant speed despite wide variations in driving voltage. For example, the motor may be driven by a 6 volt battery but the unbalanced mass of the segment 34 and the tension of spring 37 may be such that at a speed corresponding to a 3 volt driving voltage the field coils are no longer energized. Consequently the highest speed attainable will be that corresponding to 3 volts and the motor will operate at this constant speed despite variations in voltage between 3 and 6 volts.

Figure 4:
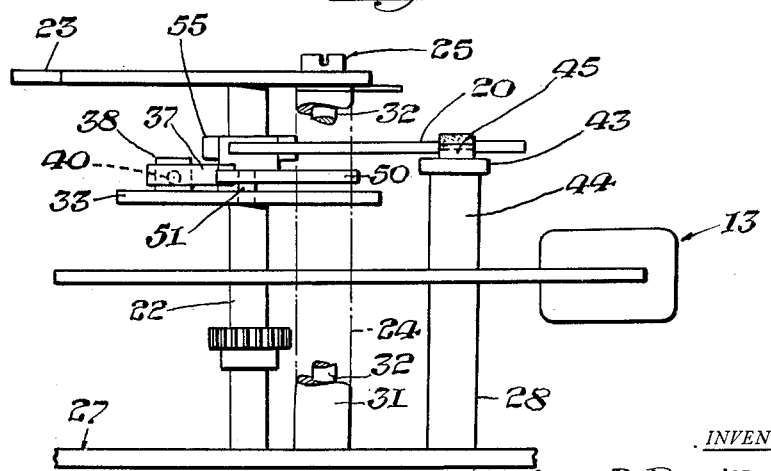
Figure 4 is a side elevation of the device of Figure 3.

In Figures 3 and 4 I have shown another form of my invention. In this form the supporting members and the general organization of the structure are identical with that of Figures 1 and 2 and these are consequently not hereindescribed.

Fixed to the rotor shaft 22 is a disk 33 which is exactly similar to the disk 33 of Figures 1 and 2. Pivoted on the upper surface of the disk 33 is a centrifugally operated member 50 which member is generally arcuate in shape extending through approximately 180° of arc and being pivoted near one end on the pivot 51. A portion of the member 50 concentric with the pivot 51 is provided with a plurality of gear teeth 52 which teeth mesh with teeth 53 formed on a hub 54.

Hub 54 is mounted upon the shaft 22 being freely rotatable thereon and is provided at a level above the teeth 53 with a cam portion 55 which cam rotates in the plane of the contacts 20 and 21 and is adapted to complete a circuit from the shaft through those contacts to the field windings 14 and 15.

The member 50 is adapted to pivot about the point 51 being normally held in the position shown in Figure 3 by means of a spring 37 fixed to the member 50 in the same manner as the like spring 37 is fixed in the member 35. Bearing against the spring 37 is an adjusting screw 40 exactly similar to the screw 40 of Figure 1.

When the rotor assembly revolves the weight 50 tends to move in a clockwise direction (as shown in Figure 3) against the tension of the spring 37. This movement causes the hub assembly comprising the gear teeth 53, hub 54 and cam 55 to revolve in a counterclockwise direction, the extent of this rotation being a function of the peripheral speed of the rotor, the effective mass of part 50 and the amount of tension exerted on the spring 37. If the direction of rotation of the motor is counterclockwise as has been described in connection with Figure 5 it is apparent that as the motor speed increases the contact member or cam 55 is advanced more and more in the direction of rotation, thus advancing the phase of the time of contact with respect to the position of the rotor. When the contact phase is advanced beyond a certain critical point the applied electromotive force will tend to oppose the rotative force and if the contact advance is made sufficiently great all rotative force will be completely cancelled. By proper selection of values for the mass of the centrifugal member 50, the tension of the spring 37 and the "at rest" position of the member 55 with respect to the magnetic axis of the rotor 23, the device can be adjusted to limit the motor speed to any desired value.

Moreover, with the arrangement of this second form of my invention the efficiency of the motor can be considerably increased since the phasing of the closure of the electrical circuit to the field coils is advanced during running as respects the position at starting. This makes it possible to start the motor under the most advantageous conditions and also to so time the making and breaking of the winding circuits as to yield great efficiency during running conditions. In fact, during running conditions the contacts are so phased that were that phasing to be maintained the motor would not start from rest. Thus the device of this second embodiment, in addition to performing the function of governing the upper limit of speed of the device, secures both reliable starting and efficient operating conditions.

While I have described preferred embodiments of my invention it will be understood that many other modifications may be made without departing from the spirit of my invention. I wish therefore to be limited not by the foregoing description but, on the contrary, solely by the claims granted to me.

What is claimed is:

1. In a governor for an electrical motor of the class described and having energizing windings and a permanently magnetic rotor, in combination, a member pivotally mounted eccentrically of the motor shaft, resilient means normally holding said member in a predetermined position against the urge of centrifugal force and a contact carried by and rotating with said pivotally mounted member, said contact means cooperating with fixed contact members to together supply current to the motor energizing windings whereby the periods of closure of contacts are altered as the motor speed increases, and the speed is limited to a desired value.

2. A device as claimed in claim 1, characterized in that a pin is provided, said pin being fixed to the shaft at a distance therefrom and extending parallel to the motor shaft, said member being mounted on said pin.

3. A device as claimed in claim 1, characterized in that said resilient means is adjustable.

4. A device as claimed in claim 1, characterized in that a disk is fixed to said rotor shaft and said member is pivotally mounted on said disk eccentrically of said shaft.

5. A device as claimed in claim 1 characterized in that said contact comprises a pin fixed in said pivotally mounted member.

6. A device as claimed in claim 5, characterized in that a disk is fixed to said rotor shaft and said pivotally mounted member is mounted on a pin fixed in said disk.

7. A device as claimed in claim 1, characterized in that said pivotally mounted member has a gear sector formed integrally therewith and further characterized in that said contact comprises a hub member having a cam portion thereon, said hub member also having a gear portion thereon, said gear portion meshing with said gear sector.

8. A device as claimed in claim 7, characterized in that said hub member is freely rotatable on the motor shaft and further characterized in that said cam member cooperates with said contacts.

9. A device as claimed in claim 7, characterized in that said resilient means comprises a leaf spring fixed in said pivotally mounted member, the tension on said spring being adjustable by means of a screw mounted on said disk and bearing against said leaf spring.

10. In a governor for an electrical motor of the class described and having energizing windings and a permanently magnetic rotor, in combination, a disk mounted on the rotor shaft for rotation therewith, a weight pivotally mounted on said disc eccentrically of the motor shaft, means for limiting the movement of said weight under the urge of centrifugal force, spring means for urging said weight to a normal position, and a pin extending from said weight, said pin cooperating with fixed contacts to control the periods of energization and de-energization of the energizing windings.

11. In a governor for an electrical motor of the class described and having energizing windings and a permanently magnetic rotor, in combination, a disk mounted on the rotor shaft for rotation therewith, a weight pivotally mounted on said disk eccentrically of the motor shaft, a gear sector formed on a surface of said weight, a hub mounted on the rotor shaft, a gear sector formed integrally with said hub, said gear sector meshing with said gear sector on said weight whereby the position of said hub may be varied with respect to the position of said disk, spring means urging said weight to a normal position and a cam integral with said hub, said cam cooperating with fixed contacts to control the phase of periods of energization and de-energization of the energizing windings, the phase being varied with respect to the position of the rotor and of said disk.

References Cited in the file of this patent

UNITED STATES PATENTS

| | | |
|---|---|---|
| 1,985,357 | Wallace | Dec. 25, 1934 |
| 2,173,282 | List | Sept. 19, 1939 |
| 2,181,841 | Wallace et al. | Nov. 28, 1939 |
| 2,181,842 | MacKay | Nov. 28, 1939 |
| 2,457,637 | Brailsford | Dec. 28, 1948 |
| 2,589,369 | Granquist | Mar. 18, 1952 |